(12) United States Patent
    Strahle (10) Patent No.: US 10,765,943 B2
(45) Date of Patent: *Sep. 8, 2020

(54) GAMING PERIPHERAL WITH INTELLIGENT AUDIO CONTROL

(71) Applicant: Performance Designed Products LLC, Burbank, CA (US)

(72) Inventor: Brad Strahle, Burbank, CA (US)

(73) Assignee: PERFORMANCE DESIGNED PRODUCTS LLC, San Diego, CA (US)

( * ) Notice: Subject to any disclaimer, the term of this patent is extended or adjusted under 35 U.S.C. 154(b) by 68 days.

This patent is subject to a terminal disclaimer.

(21) Appl. No.: 16/171,344

(22) Filed: Oct. 25, 2018

(65) Prior Publication Data

US 2019/0060751 A1    Feb. 28, 2019

Related U.S. Application Data

(62) Division of application No. 15/613,042, filed on Jun. 2, 2017, now Pat. No. 10,143,921.

(51) Int. Cl.
    *A63F 13/424*    (2014.01)
    *A63F 13/332*    (2014.01)
    (Continued)

(52) U.S. Cl.
    CPC ............ *A63F 13/424* (2014.09); *A63F 13/24* (2014.09); *A63F 13/332* (2014.09); *A63F 13/98* (2014.09); *A63F 2250/497* (2013.01)

(58) Field of Classification Search
    CPC ........ A63F 13/424; A63F 13/24; A63F 13/98; A63F 13/332; A63F 2250/497
    See application file for complete search history.

(56) References Cited

U.S. PATENT DOCUMENTS

| 5,641,319 A | 6/1997 | Stoel |
| 2003/0220142 A1 | 11/2003 | Siegel |

(Continued)

OTHER PUBLICATIONS

Loring, Chien, What is an ir blaster, and what does it do?, May 23, 2015, https://www.quora.com/What-is-an-ir-blaster-and-what-does-it-do.

(Continued)

*Primary Examiner* — Kevin Y Kim
(74) *Attorney, Agent, or Firm* — Sheppard, Mullin, Richter & Hampton LLP (57) ABSTRACT

A gaming controller can include a housing; a plurality of input components; a processor; a wired or wireless interface communicatively couplable with a headset; a wired or wireless interface communicatively couplable with a gaming console, the gaming console communicatively couplable with an audiovisual system; an audio headset detection circuit that detects if a headset is coupled with the gaming controller; a transmitter that transmits an audio control signal causing the audio of the audiovisual system to be adjusted if the audio headset detection circuit detects (automatically or on command) that no audio headset is coupled with the gaming controller; and a transmitter that transmits an audio control signal causing the audio of the headset to be adjusted if the audio headset detection circuit detects (automatically or on command) that an audio headset is coupled with the gaming controller.

19 Claims, 4 Drawing Sheets

(51) Int. Cl.
  *A63F 13/98* (2014.01)
  *A63F 13/24* (2014.01)

(56) References Cited

U.S. PATENT DOCUMENTS

| | | | | |
|---|---|---|---|---|
| 2004/0023719 | A1* | 2/2004 | Hussaini | A63F 13/06 |
| | | | | 463/37 |
| 2006/0147059 | A1* | 7/2006 | Tang | H04R 5/04 |
| | | | | 381/104 |
| 2010/0001893 | A1 | 1/2010 | Kim | |
| 2015/0367234 | A1 | 12/2015 | Jones | |

OTHER PUBLICATIONS

Anonymous Anonymous: Control your TV receiver wiht your Siri Remote or Apple TV Remote, Oct. 11, 2016, XP055498265, retrieved from internet: https://web.archive.org/web/20161011162134/https://support.apple.com/en-us/HT205225.

International Search Report and Written Opinion for PCTUS2018034963 dated Aug. 17, 2018, 16 pages.

Jimmy Selix: "PS4: How to Output All Audio to Headphones Plugged into DualShock 4 Controller" Nov. 21, 2013: https://web.archive.org/web/20131121052112/http://www.tech-recipes.com/rx/46201/ps4-how-to-output-all-audio-to-headphones-plugged-intodualshock-4-controller/.

* cited by examiner

GAMING PERIPHERAL WITH INTELLIGENT AUDIO CONTROL

CROSS-REFERENCE TO RELATED APPLICATIONS

This application is a divisional of and claims the benefit of U.S. patent application Ser. No. 15/613,042 filed on Jun. 2, 2017 and issued as U.S. Pat. No. 10,143,921 on Dec. 4, 2018, which is incorporated herein by reference in its entirety.

TECHNICAL FIELD

The present disclosure relates generally to gaming peripherals, and some embodiments more particularly relate to intelligent audio control for gaming controllers.

BACKGROUND OF THE DISCLOSURE

Videogame systems continue to be of great popularity among consumers of all ages. Videogames are no longer just for the young, and there are games and activities for all ages. A large percentage of households and even many offices have at least one videogame system. Modern videogame systems typically include a console, one or more handheld controllers, an audiovisual system, and a remote.

The console runs the videogame program, plays DVD or other media, runs applications, accesses the Internet and performs other like functions. The handheld controllers, sometimes referred to as gaming controllers, joypads or gamepads, transmit signals to the console to implement desired functionality in the videogame environment. For example, the handheld controllers can send signals to control game characters and instruments, adjust game setup, navigate through the gaming environment, and otherwise control the system. The audiovisual system presents sounds and images corresponding to the game or other application being run on the console using audio and video signals received from the console. The system remote, if included, controls settings and features of the audiovisual system and/or the console. For example, the system remote may provide audio control for the audiovisual system.

The audiovisual systems most commonly used among gamers are television sets or monitors. Television sets can convey both the audible sounds and visual images of the videogame based on the audio and video input signals received from the console. In some instances gamers prefer to use a headset or other earphone device as an alternative to television speakers. And in some instances gamers switch back and forth between a headset and a television to provide the relevant audio.

In some modern videogame systems, users may adjust the audio of the audio produced by a connected headset by pressing buttons on their handheld controller. However, when the user switches from using the headset to using the television for audio (or simply begins by using the television's audio functionality) the user cannot adjust the audio of the television audio from their handheld controller. Instead, to change the audio of the audio outputted by the television a user must operate the remote. This can be frustrating to gamers for various reasons. First, frustration can arise because the gamer is forced to locate and operate another device (the remote) to change the audio output from the television. This often means the user must pause the game (to the extent it can be paused) while they adjust the audio; or the user must take one of their hands off the controller to operate the audio up or audio down buttons on the remote while the videogame continues. Each of these drawbacks, among others, can compromise the gamer's performance in the videogame and/or interrupt the user's gaming experience.

BRIEF SUMMARY OF THE DISCLOSURE

According to an embodiment of the disclosed technology a gaming controller may include: a housing coupled with a plurality of input components, a processor, an audio jack for receiving an audio connector of an audio headset (the audio jack communicatively coupled with the processor), a first cable communicatively coupled to the processor (the first cable affixed to the housing at a proximal end, and insertable into a socket of a gaming console at a distal end to establish a connection to the gaming console, the gaming console communicatively coupled to an audiovisual system over a second cable), an audio headset detection circuit communicatively coupled to the processor, the audio headset detection circuit including a switch coupled to the audio jack. The switch of the audio headset detection circuit may be caused to be in a first state when an audio connector has been plugged into the audio jack, the switch being caused to be in a second state when no audio connector has been plugged into the jack. Embodiments may include a transmitter that transmits an audio control signal (responsive to actuation of input components corresponding to an audio control operation) causing an audio attribute of sound outputted by a speaker of the audiovisual system to be adjusted if the switch of the audio headset detection circuit is in the second state.

In some embodiments, embodiments of the gaming controller of the present disclosure includes a transmitter (which may be the same or different transmitter as the transmitter discussed in the immediately preceding paragraph) transmits an audio control signal, responsive to actuation in input components corresponding to an audio control operation, causing an audio attribute of sound outputted by a speaker of the audio headset to be adjusted if the switch of the audio headset detection circuit is in the first state. The first state may be a closed state and the second state may be an open state, or vice versa.

In some embodiments, the actuation of input components corresponding to an audio control operation includes one or more of: a pattern of simultaneous input component actuations, an ordered sequence of individual input component actuations, and a single individual input component actuation.

In some embodiments, the audio control signal may be transmitted from the gaming controller to the console over the first cable. The videogame console may responsively generate a second signal based upon the audio control signal, the second signal may then be transmitted to the audiovisual system over the second cable. The audio control signal, viewed alone or together with the second signal, causing or otherwise effectuating an adjustment in the audio attribute of sound outputted by a speaker of the audiovisual system (e.g., a television set).

According to an embodiment of the disclosed technology a gaming controller may include: a housing, a plurality of input components, a processor, a first communications circuit (e.g., a wired or wireless communications circuit) communicatively coupleable with a gaming console (the gaming console communicatively coupleable with a television set), a second communications circuit (e.g., a wired or wireless communications circuit) communicatively coupleable with a gaming headset, and a non-transitory computer readable medium. The non-transitory computer readable medium may include machine readable instructions that, when executed by the processor, cause the gaming controller (e.g., via a computing component, sensor, or circuit thereof) to: determine if the gaming headset is communicatively coupled with the second communications circuit; transmit (responsive to actuation of input components corresponding to an audio control operation): (i) a signal causing the audio of sound emissions outputted by an audio output device of the headset to be adjusted in accordance with the audio control operation, if it is determined that the gaming headset is communicatively coupled with the second communications circuit, or (ii) a signal causing the audio of sound emissions outputted by an audio output device of the television set to be adjusted in accordance with the audio control operation, if it is determined that the gaming headset is not communicatively coupled with the second communications circuit.

In some embodiments, the input components include one or more of a button, a directional pad, a joystick, a dial, a trigger, a bumper, a wheel, and a switch.

In some embodiments, the first communications circuit communicatively coupleable with the console includes a wireless communication module. Such a wireless communication module may include one or more of an RF transmitter, an RF receiver, an IR transmitter, and an IR receiver, etc. In some embodiments, the first communications circuit communicatively coupleable with the console includes a wire (e.g., a cable).

In some embodiments, the second communications circuit communicatively coupleable with the console includes a wireless communication module. Such a wireless communication module may include one or more of an RF transmitter, an RF receiver, an IR transmitter, and an IR receiver, etc. In some embodiments, the second communications circuit communicatively coupleable with the console includes a wire (e.g., a cable).

In some embodiments, the audio control operation includes one or more of a volume increase, a volume decrease, an audio muting, audio adjustment of speech sounds relative to background sounds in the videogame environment, and audio adjustment of bass sounds relative to treble sounds, or any other adjustment of any other audio attribute.

In some embodiments, the actuation of input components corresponding to an audio control operation includes one or more of a pattern of simultaneous input component actuations, a sequence of individual input component actuations, and a singular individual input component actuation.

In some embodiments, the signal causing the audio of sound emissions outputted by an audio output device of the television set is transmitted to the console, the console responsively signaling to the television set to adjust the audio of sound emissions in accordance with the signal received from the gaming controller. In some embodiments, the signal causing the audio of sound emissions outputted by an audio output device of the television set is transmitted directly to the television set.

According to an embodiment of the disclosed technology a gaming controller may include: a housing, a plurality of input components, a processor, a first communications circuit communicatively couplable with a gaming console (the gaming console communicatively couplable with an audiovisual system), a second communications circuit communicatively couplable with a gaming headset, and a non-transitory computer readable medium. In embodiments, the non-transitory computer readable medium includes machine readable instructions that, when executed by the processor, cause the gaming controller (e.g., via a computing component, sensor, or circuit thereof) to: determine if the gaming headset is communicatively coupled with the second communications circuit; and transmit (responsive to actuation of input components corresponding to an audio control operation): (i) a signal causing the audio of sound emissions outputted by an audio output device of the headset to be adjusted in accordance with the audio control operation, if it is determined that the gaming headset is communicatively coupled with the second communications circuit; or (ii) a signal causing the audio of sound emissions outputted by an audio output device of the audiovisual system to be adjusted in accordance with the audio control operation, if it is determined that the gaming headset is not communicatively coupled with the second communications circuit.

In some embodiments, the input components may include one or more of a button, a directional pad, a joystick, a dial, a trigger, a bumper, a wheel, a slider switch, and a toggle switch.

In some embodiments, the first communications circuit communicatively couplable with the console is a wireless communications module. The wireless communications module may include one or more of an RF transmitter, an RF receiver, an IR transmitter, and an IR receiver. Alternatively or additionally, the first communications circuit may include a wire (e.g., a cable).

In some embodiments, the second communications circuit communicatively couplable with the console is a wireless communications module. The wireless communications module may include one or more of an RF transmitter, an RF receiver, an IR transmitter, and an IR receiver. Alternatively or additionally, the second communications circuit may include a wire (e.g., a cable).

In some embodiments, the audio control operation includes one or more of a volume increase, a volume decrease, an audio muting, audio adjustment of speech sounds relative to background sounds in the videogame environment, and audio adjustment of bass sounds relative to treble sounds, or any other adjustment of any other audio attribute.

In some embodiments, the actuation of input components corresponding to an audio control operation includes one or more of a pattern of simultaneous input component actuations, a sequence of individual input component actuations, and a singular input component actuation.

In some embodiments, the signal causing the audio attributes of sound emissions outputted by an audio output device of the audiovisual system is transmitted to the console (the console responsively signaling to the audiovisual system to adjust the audio of sound emissions in accordance with the signal received from the gaming controller).

In some embodiments, the signal causing the audio attributes of sound emissions outputted by an audio output device of the audiovisual system is transmitted directly to the audiovisual system (e.g., a television set).

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

Some of the figures included herein illustrate various embodiments of the disclosed technology from different viewing angles. Although the accompanying descriptive text may refer to such views as "top," "bottom" or "side" views, such references are merely descriptive and do not imply or require that the disclosed technology be implemented or used in a particular spatial orientation unless explicitly stated otherwise.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION

Embodiments of the technology disclosed herein relate to systems and methods for allowing a gamer or other user to control audio functions of a videogame system using a gaming controller without the need to access a system remote to control such audio functions. For example, in some embodiments, the gaming controller includes audio control buttons and can be configured to detect whether it is connected to an audio headset (e.g., headphones, earbuds, etc.) via a wired or wireless interface. The gaming controller can be configured such that if the gaming controller detects a connection to an audio headset, user manipulation of the audio control buttons controls the audio signals to the audio headset. For example, this can control headset audio, chat audio, chat mute, audio balance, and so on. The gaming controller can further be configured such that if the gaming controller determines that there is no audio headset connected, user manipulation of the audio control buttons controls the audio signals to the console. For example, this can control game audio, audio balance, chat audio and chat mute (such as via a system microphone, for example), and so on. Accordingly, audio control buttons on the gaming controller can be used to control system audio functions such as through the console, and the gaming controller can be configured to automatically switch over to such control if no headset is connected to the gaming controller. Although described in terms of gaming applications within the videogame environment, systems and methods disclosed herein can be implemented with other applications of the videogame console, and with media devices other than videogame consoles as well.

Figure 1:
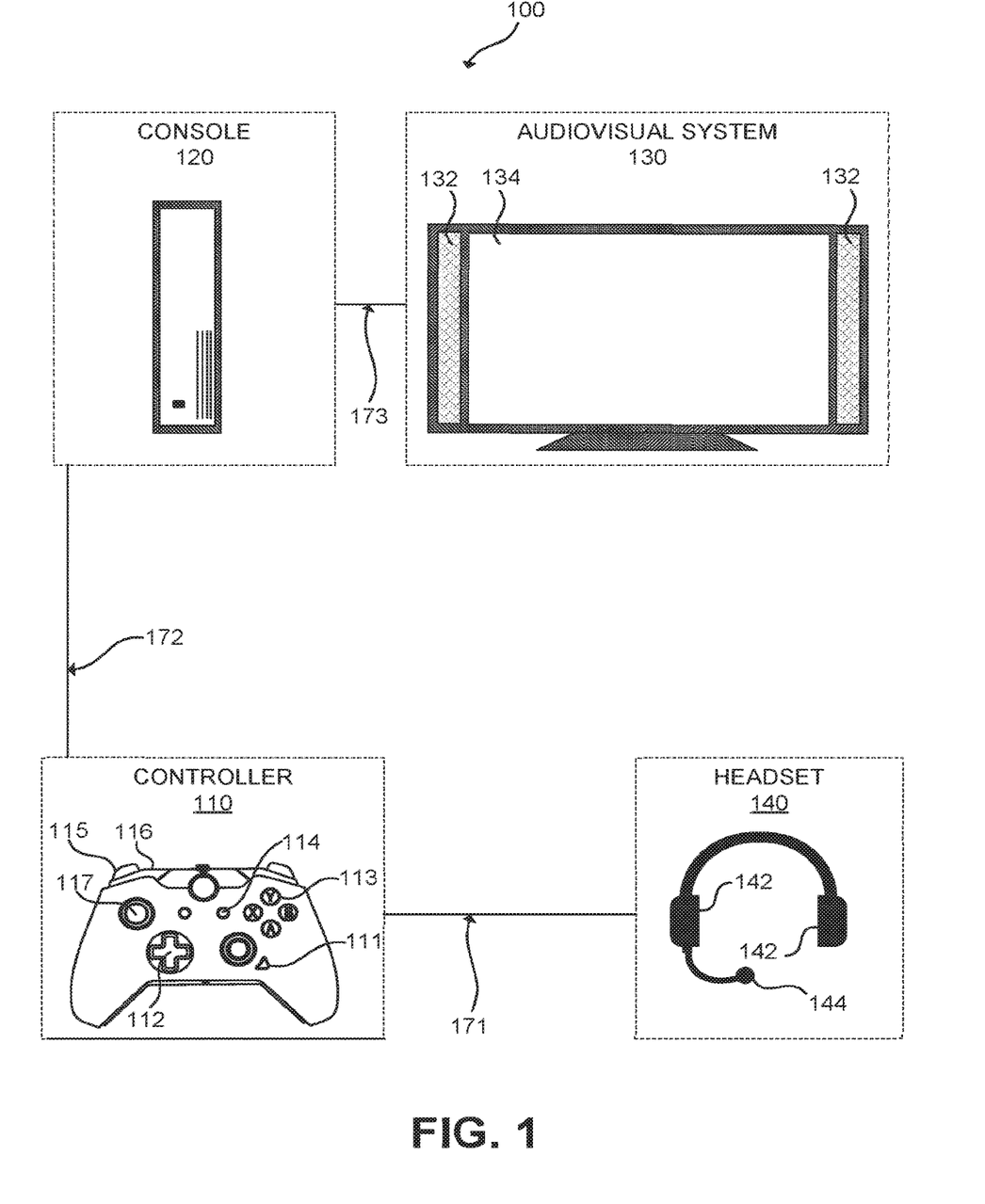
FIG. 1 illustrates an example videogame environment in which one or more embodiments of the present disclosure may be implemented.

FIG. 1 illustrates an example videogame system 100 in which one or more embodiments of the present disclosure may be implemented. As depicted in this example, the videogame system may include one or more controllers 110, a console 120, an audiovisual system 130, and a headset 140. In operation, controller 110 is in communication with console 120 over communication link 172, and console 120 is in communication with audiovisual system 130 over communication link 173. Console 120 runs applications such as, for example, videogame programs, and it generates audio and video signals that may be sent to the audiovisual system (over communications link 173) such that the user can hear the sounds and see the images of the videogame, immersing themselves in the videogame experience. For example, console 120 may send audio, video and other signals (e.g., control signals such as Consumer Electronics Control (CEC)), to a monitor of audio visual system 130 (or to an a/v receiver) via a HDMI (High-Definition Multimedia Interface), Digital Visual Interface (DVI) or other connection.

Console 120 receives signals from controller 110 (over wired or wireless communications link 172) that control functionality available through the videogame programs and other applications. The console 120 may also transmit signals to the controller 110 (over communications link 172) to provide feedback (e.g., signals for vibration/shock control, blinking lights, biostimulus feedback, etc) to the user during the game. Communications link 172 may be a wired or wireless communications link.

The controller 110 may also be in communication with headset 140 (over communications link 171). In instances where the headset 140 is used as the audio output device, the controller 110 may convey audio signals to the headset 140 (over communications link 172) based on the audio signals received from console 120 (over communications link 172). Communications link 171 may be a wired or wireless communications link. Similarly, Communications link 172 may be a wired or wireless communications link.

Audiovisual system 130 and headset 140 may each include one or more audio output devices. These may include, for example, speakers, bone conduction devices (in the case of a headset) or other audio transducers. A user may desire to use the speakers 132 and the display 134 of the audiovisual system 130 to provide the sounds and images of the game, respectively. Alternatively, a user may elect to use the speakers 142 of headset 140 to provide the sounds of the game, while continuing to use the display 134 of the audiovisual system to provide the images. And in still further instances, a user may switch back and forth between using the speakers 142 of headset 140 and the speakers 132 of audiovisual system 130 during a given gaming session.

As discussed in more detail with reference to FIGS. 2-5, controller 100 can generate and transmit audio control signals to either or both of the console 120 and the headset 140 (or the audiovisual system 130), depending on whether the headset 140 is connected with the controller 110 or selected as the audio device. A headset detection circuit (discussed in more detail below) can be included in the controller 110 and used to determine whether it is connected to a headset 140. The audio control signals transmitted from the controller may be triggered by a user pressing (or otherwise actuating) one or more input components of controller 110 in a predefined manner.

Before discussing additional details of the controller of the present disclosure, it should be noted that although FIG.

1 depicts the audiovisual system 130 as a television set (with speakers 132 and a display 134 embodied in the same device), any type of audiovisual system may be employed. That is, it should be appreciated by one of ordinary skill in the art that the technology disclosed herein may be implemented in environments including any type of audiovisual systems—including audiovisual systems where the display and speakers are embodied in separate devices (e.g., a computer monitor and detached computer speakers, a television with sound bar, a surround sound or home theater system, and so on).

Figure 2:
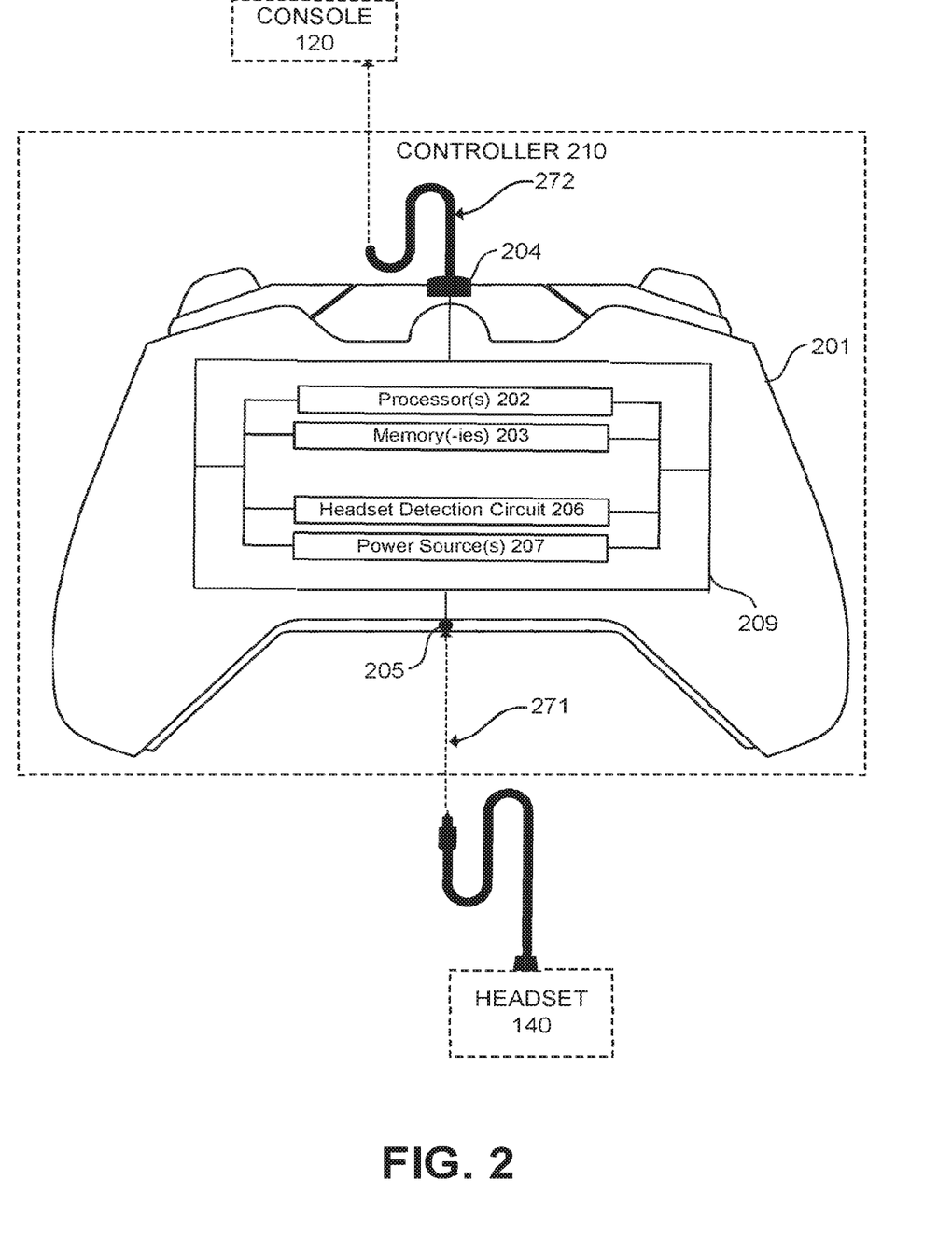
FIG. 2 is a block diagram illustrating various components of an example gaming controller with intelligent audio control in accordance with one or more embodiments of the present disclosure.

FIG. 2 is a block diagram illustrating various components of an example gaming controller 210 with intelligent audio control in accordance with one or more embodiments of the present disclosure. Controller 210 in the illustrated example includes a housing 201, a processor 202, a memory 203, a first port 204 (tied into, or part of, a communications circuit), a second port 205 (tied into, or part of, a communications circuit), a headset detection circuit 206, and a power source 207. As shown, first port 204 may be coupled to a cable or other wired interface 272 (e.g., communications link 172 of FIG. 1) that links the controller 210 to the console 120. Further, second port 205 may be coupled to a cable or other wired interface 271 that links the controller 210 to the headset 140 (e.g., communications link 171 of FIG. 1). The first port 204 and second port 205 may include, be part of, or be coupled to one or more communications circuits. A communications circuit is a circuit arranged for transmitting one or more output signals over a communications channel based on one or more inputs from another source.

It should be noted that the first and second ports may take any form. For example, in some embodiments first port 204 may be an electrical connector, or even simply the soldered connection point to internal circuit board held within the housing 201 of the controller 210. In such embodiments the first port 204 is fixedly attached to wired interface 272 such that a user need only plug the other end of wired interface 272 into a socket of console 120 to establish a communications link. In such embodiments wired interface 272 may be considered part of the controller 210 itself. In other example some embodiments the first port 204 may include a socket within which a complementary plug connected to wired interface 272 may be removably plugged. In such embodiments wired interface 272 may not be considered an integral part of the controller 210 itself.

Likewise, in some example embodiments the second port 205 may include a socket (e.g., an auxiliary jack) within which a complementary plug (e.g., a 3.5 mm AUX connector) connected to wired interface 271 may be removably plugged.

As shown the processor 202, memory 203, headset detection circuit 206, first port 204, second port 205, and the power source 207 are communicatively coupled together. Such communicative coupling may be provided via any hard wired (e.g., bus 209) or wireless connection known in the art. Any one or more of the foregoing may be integrated onto one or more chipsets or circuit boards that provide structure and connection points enabling interoperability/communication between any one or more of the foregoing components. Additionally, and in a similar manner, any one or more of the foregoing components may be further communicatively coupled to sensors of the controller 210 that detect actuation of the input components of the controller. Though such input components are not shown in FIG. 2, it will be understood that the user input components may include or more of a shift button, directional pad, ABXY buttons, menu button, trigger, bumper, joystick, or any other type of input component known in the art or which may hereafter be used in the art. It will further be understood that sensors (not shown) provided with the controller may detect or otherwise sense actuations such as pressing, toggling, touching, or maneuvering one or more of the input components. Such capabilities are commonly known in the art, and need not be repeated here.

In some embodiments, audio control signals (e.g., audio control, mute, tone, balance, etc.) may be generated and transmitted upon actuation of one or more of the input components either alone, in a pattern, sequentially, simultaneously, or any combination of the foregoing. The input components may include, for example, buttons, triggers, toggles, switches, wheels, joysticks, D-pads, and so on. Though FIG. 2 does not expressly depict these input components, it will be appreciated by one of ordinary skill in the art that any may be used, in any predefined manner (predefined by a manufacturer, distributor, or user), to generate a signal that can be used for audio control. Some example input components are shown in FIG. 1—e.g., the shift button 111, directional pad 112, ABXY buttons 113, menu button 114, trigger 115, bumper 116, joystick 117. As noted, generation of the audio control signal may be triggered by a user pressing or otherwise actuating any one or more input components on controller 210 in a predefined manner (e.g., simultaneous pressing of the "shift" button and the "up" button of the directional pad triggers the generation of an audio volume increase signal while simultaneous pressing of the "shift" button and the "down" button of the directional pad triggers the generation of an audio volume decrease signal).

In some embodiments, actuation of one or more of the input components (either alone, in a pattern, sequentially, simultaneously, or any combination of the foregoing), may control a videogame operation when in a first mode (e.g., control various characters or objects of the videogame, etc.), and control audio functionality when the gaming controller is in a second mode. Thus, the present technology may be implemented in embodiments such as those disclosed in U.S. patent application Ser. No. 14/995,554, which is incorporated herein by reference in its entirety.

Any number of audio control signals may be generated based on any number of input component actuation patterns to effectuate any number of audio control operations. That is, although "audio volume increase" and "audio volume decrease" operations were provided above as an example, there may be many other operations associated with such many other input component actuation patterns. To provide a few nonlimiting examples, input component actuation patterns may be associated with the following audio control operations: muting, bass/treble enhancements (or other musical feature adjustments), chat (e.g., speech)/audio (e.g., background music) mix audio, left-right balance, forward-backward balance, subwoofer audio, and the like.

Based on a given actuation pattern of the input components, the controller 210 can generate one or more audio control signals and transmit them to either the console 120 or the headset 140 (via respective communications links), depending on whether the headset detection circuit 206 has detected that a headset 140 is plugged into the second port 205 of the controller 210.

For example, if the headset detection circuit 206 detects that an inlet connector (e.g., 3.5 mm AUX connector) is plugged into the second port 205 (e.g., an AUX jack), the controller 210 may transmit audio control signals to the headset 140 or to audio circuits in the controller 210 used to drive a headset, such that the corresponding adjustment to the audio is reflected at the headset speakers and microphone as appropriate. On the other hand, if the headset detection circuit 206 detects that a headset 140 device is not plugged into the second port 205 of the controller, the controller 210 may instead transmit the audio control signals (e.g., based on the same input component actuation pattern) to the console 120 such that the console 120 control circuitry is prompted to correspondingly adjust audio signals to be sent to the audio output device (e.g., audiovisual system 130), and the audiovisual system 130 circuitry causes a corresponding adjustment to the output audio of one or more of its speakers.

Thus, instead of having to use a separate remote to control the audio emitted from the connected television's speakers, in embodiments of the present disclosure a user can seamlessly control the audio of either the speakers of the television set, or the speakers of a their headphones, based upon which one is in presently in use at any given moment (e.g., the moment when the input component actuation occurs).

Figure 3:
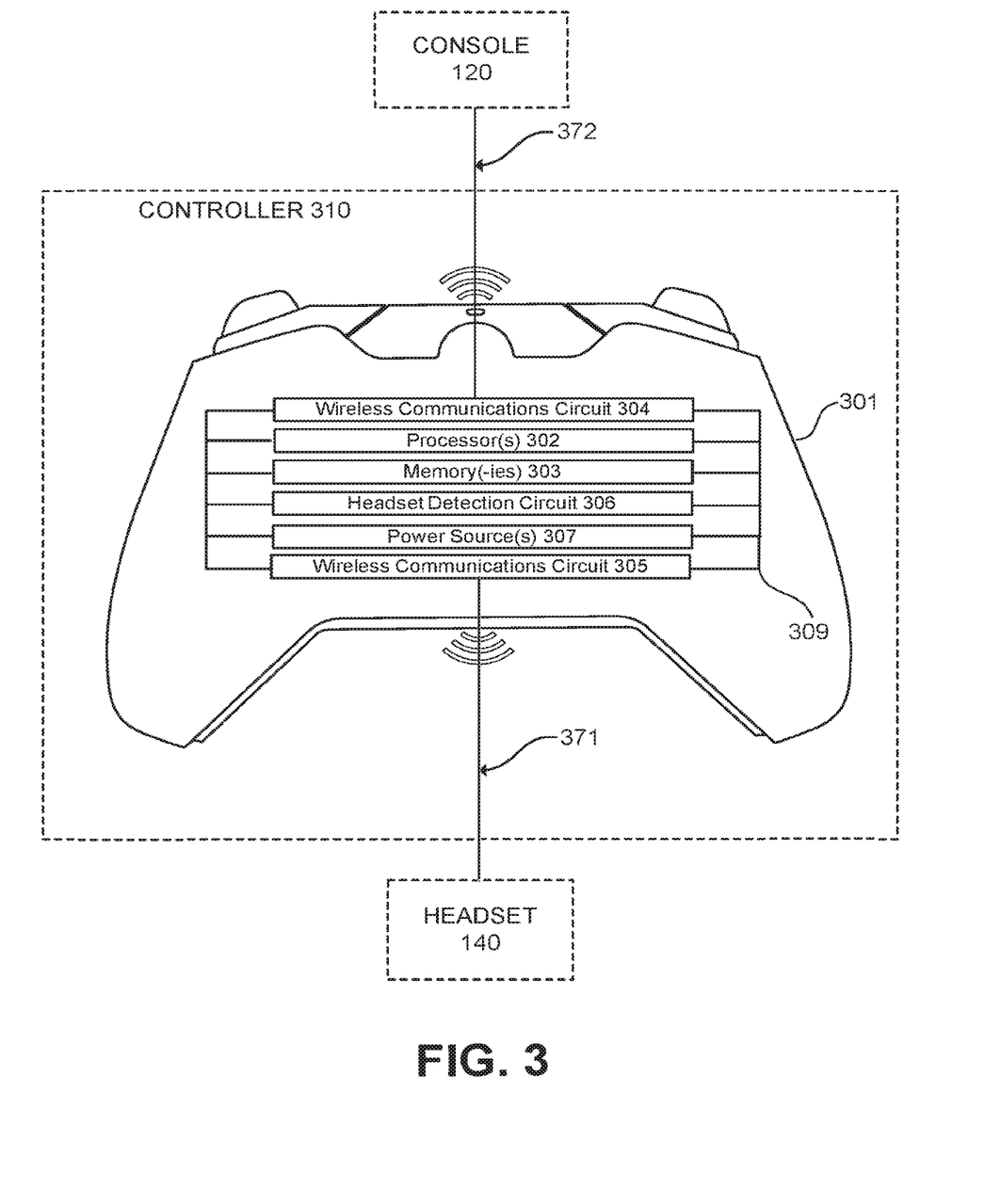
FIG. 3 is a block diagram illustrating various components of an example gaming controller with intelligent audio control in accordance with one or more embodiments of the present disclosure.

The discussion above with reference to FIG. 2 contemplates a controller that communicates with the console and the headset through wired communications links 272 and 271. However, the present technology may also be deployed in embodiments where one or more of the communications links are wireless. While in some embodiments it may be that just one or the other of communication links 271 and 272 are wireless and the other wired (e.g., a wireless communication channel between the controller and the console but a wired communication channel between the controller and the headset), in some instances they may both be wireless. FIG. 3 below depicts a fully wireless embodiment, as discussed below.

FIG. 3 is a block diagram illustrating various components of an example gaming controller 310 with intelligent audio control in accordance with one or more embodiments of the present disclosure. Controller 310 in the illustrated example includes a housing 301, a processor 302, a memory 302, a first wireless communications circuit 304, a second wireless communications circuit 305, a headset detection circuit 306, and a power source 307. First wireless communications circuit 304 may include a transmitter, a receiver, or both (a transceiver) that links the controller 310 to the console 120 (communications link 372 being wireless in this example) in accordance with a wireless communications protocol, including any wireless protocol known in the art. Similarly, second wireless communications circuit 305 may include a transmitter, a receiver, or both (a transceiver) that links the controller 310 to the headset 140 (over communications link 371 being wireless in this example) in accordance with a wireless communications protocol, including any wireless protocols known in the art.

For example, first wireless communications circuit 304 and/or second wireless communications circuit 305 may include one or more of an IR transceiver module, an RF transceiver module (e.g., a Bluetooth module communicating in accordance with Bluetooth protocols, or a WiFi Module communicating in accordance with WiFi protocols), or any other wireless module or chipset configured with a transmitter to transmit wireless signals, and/or a receiver to receive wireless signals, or a transceiver to both transmit and receive wireless signals. In some embodiments, one or more of the wireless communications circuits may include multiple interfaces. For example, in some embodiments the first second wireless communications circuit 304 may include both an IR transceiver module and an RF transceiver module.

As shown the processor 302, memory 303, headset detection circuit 306, first wireless communications circuit 304, second wireless communications circuit 305, and the power source 307 are communicatively coupled together. Such communicative coupling may be provided via any hard wired (e.g., bus 309) or wireless connection known in the art. Any one or more of the foregoing components may be integrated onto one or more chips or circuit boards that provide structure and connection points enabling interoperability of any one or more of the foregoing components. Additionally, and in a similar manner, any one or more of the foregoing components may be further communicatively coupled to sensors of the controller 310 that detect actuation of the input components of the controller. Though such input components and sensors are not shown in FIG. 3, it will be understood that the user input components may include or more of a shift button, directional pad, ABXY buttons, menu button, trigger, bumper, joystick, or any other type of input component known in the art or which may hereafter be used in the art. It will further be understood that sensors provided with the controller may sense actuations such as pressing, toggling, touching, or maneuvering one or more of the foregoing input components. Such capabilities are commonly known in the art and need not be recited here.

As above, in some embodiments audio control signals (e.g., audio control, mute, tone, balance, etc.) may be generated and transmitted upon actuation of one or more of the input components either alone, in a pattern, sequentially, simultaneously, or any combination of the foregoing. The input components may include, for example, buttons, triggers, toggles, switches, wheels, joysticks, D-pads, and so on. Though FIG. 3 does not expressly depict these input components, it will be appreciated by one of ordinary skill in the art that any may be used, in any predefined manner (predefined by a manufacturer, distributor, or user), to generate a signal that can be used for audio control. Some example input components are shown in FIG. 1—e.g., the shift button 111, directional pad 112, ABXY buttons 113, menu button 114, trigger 115, bumper 116, joystick 117. As noted, generation of the audio control signal may be triggered by a user actuating one or more input components on controller 310 in the predefined manner (e.g., simultaneous pressing of the "shift" button and the "up" button of the directional pad triggers the generation of an audio volume increase signal while simultaneous pressing of the "shift" button and the "down" button of the directional pad triggers the generation of an audio volume decrease signal).

Any number of audio control signals may be generated based on any number of input component actuation patterns to effectuate any number of audio control operations. That is, although "audio volume increase" and "audio volume decrease" operations were provided above as an example, there may be many other operations associated with such many other input component actuation patterns, any one or more of which may be stored in memory 303. To provide a few nonlimiting examples, input component actuation patterns may be associated with the following audio control operations: muting, bass/treble enhancements (or other musical feature adjustments), chat (e.g., speech)/audio (e.g., background music) mix audio, left-right balance, forward-backward balance, subwoofer audio, and the like.

Based on a given actuation pattern of the input components, the controller 310 can generate one or more audio control signals and transmit them to either the console 120 or the headset 140, depending on whether or not the headset detection circuit 306 has detected that a headset 140 is communicatively coupled with the second wireless communications circuit 304 of the controller 310.

For example, if the headset detection circuit 306 detects that a headset 140 is paired with the controller via the second wireless communications circuit 305 (e.g., via Bluetooth® pairing), the controller 2310 may transmit audio control signals to the headset 140 or to audio circuits in the controller 310 used to drive a headset, such that the such that the corresponding adjustment to the audio is reflected at the headset speakers and microphone as appropriate. On the other hand, if the headset detection circuit 306 detects that no headset 140 device is wirelessly paired with the controller 310 (or that an already paired headset 140 has been elected not to be used at the given time), the controller 310 may instead transmit audio control signals (e.g., based on the same input component actuation pattern) to the console 120 such that the console 120 control circuitry is prompted to correspondingly adjust audio signals to be sent to the audiovisual system 130, such that the corresponding adjustment to the audio is reflected at the audio output device (e.g., speakers) of the audiovisual system (e.g., television).

Thus, instead of having to use a separate remote to control the audio (e.g., the audio of the audio) emitted from the connected television's speakers, in embodiments of the present disclosure a user can seamlessly control the audio of either the speakers of the television set, or the speakers of a their headphones, based upon which one is in use, or otherwise operable, at any given moment (e.g., the moment when the input component actuation occurs).

Though the discussion above with reference to FIG. 3 discusses an example controller that communicates with the console and the headset through two wireless communications links 372 and 371 that are provided by two dedicated wireless communications circuits, it should be understood that such examples are nonlimiting and are provided merely for ease of discussion and understanding. One of ordinary skill in the art will appreciate that the present technology may be deployed with a greater or fewer number of wireless communications circuits. For example, some embodiments may only include a single wireless communications circuit. In some such embodiments the wireless communications circuit may be capable of wireless communications with one or both of console 120 and/or headset 140 (and in some instances also capable of directly communicating with the audiovisual system 130), separately or simultaneously.

Moreover, although the functional components of gaming controller 310 (e.g., headset detection circuit 306, wireless communications circuit 304, wireless communications circuit 305) are partitioned in this example in the manner as illustrated the example of FIG. 3, it is noted that this partitioning is done for clarity of description and by way of example only. After reading this description, one of ordinary skill in the art will understand how different architectures or alternative partitioning of the circuits can be used for the gaming controller 310. For example, in some embodiments, the headset detection circuit 306 can be included as part of the wireless communications circuit 305. Additionally, components such as processing devices, memory components, communications buses and so on can be shared among two or more of these multiple functional units. Indeed, in some applications, for example, a single microprocessor (whether single-core or multi-core) system can be used to implement the functions of one or more of wireless communications circuit 304, headset detection circuit 306, and wireless communications circuit 305, as well as any other digital/electronic portions of the various gaming controller systems.

Moreover, though the discussion above with reference to FIGS. 2 and 3 discuss example controllers that transmit audio control signals directly to the console 120 which can then send a corresponding signal to the audiovisual system 130 to cause audio adjustment, it should be understood that such examples are nonlimiting and are provided merely for ease of discussion and understanding. For example, controllers 210 and 310 may also be provided with a direct communications link (not depicted) to the audiovisual system itself, such that the audio control signals do not need to take a path through the console to reaching the audiovisual system 130. Indeed, in this manner controllers of the present technology may be further configured to operate as a system remote, capable of controlling any one or more parameters of the audiovisual system (e.g., a television, AV receiver, etc.) that would normally be handled by a separate remote control device. For example, in some such embodiments of the present disclosure, the user may adjust the display brightness, contrast, color, or other image features of display 134 (by actuating predefined patterns of the user input components corresponding to such operations). In other example embodiments of the present disclosure, the user may operate the channel tuner of a set top box by actuating predefined patterns of the user input components corresponding to such operations.

Thus, instead of having to use a separate remote to control audiovisual system functions (e.g., television features), embodiments of the present disclosure enable a user to seamlessly control such features at any given moment based on the audio output device or video output device in operation with the controller at that moment (the moment when the corresponding input component actuation occurs).

Figure 4:
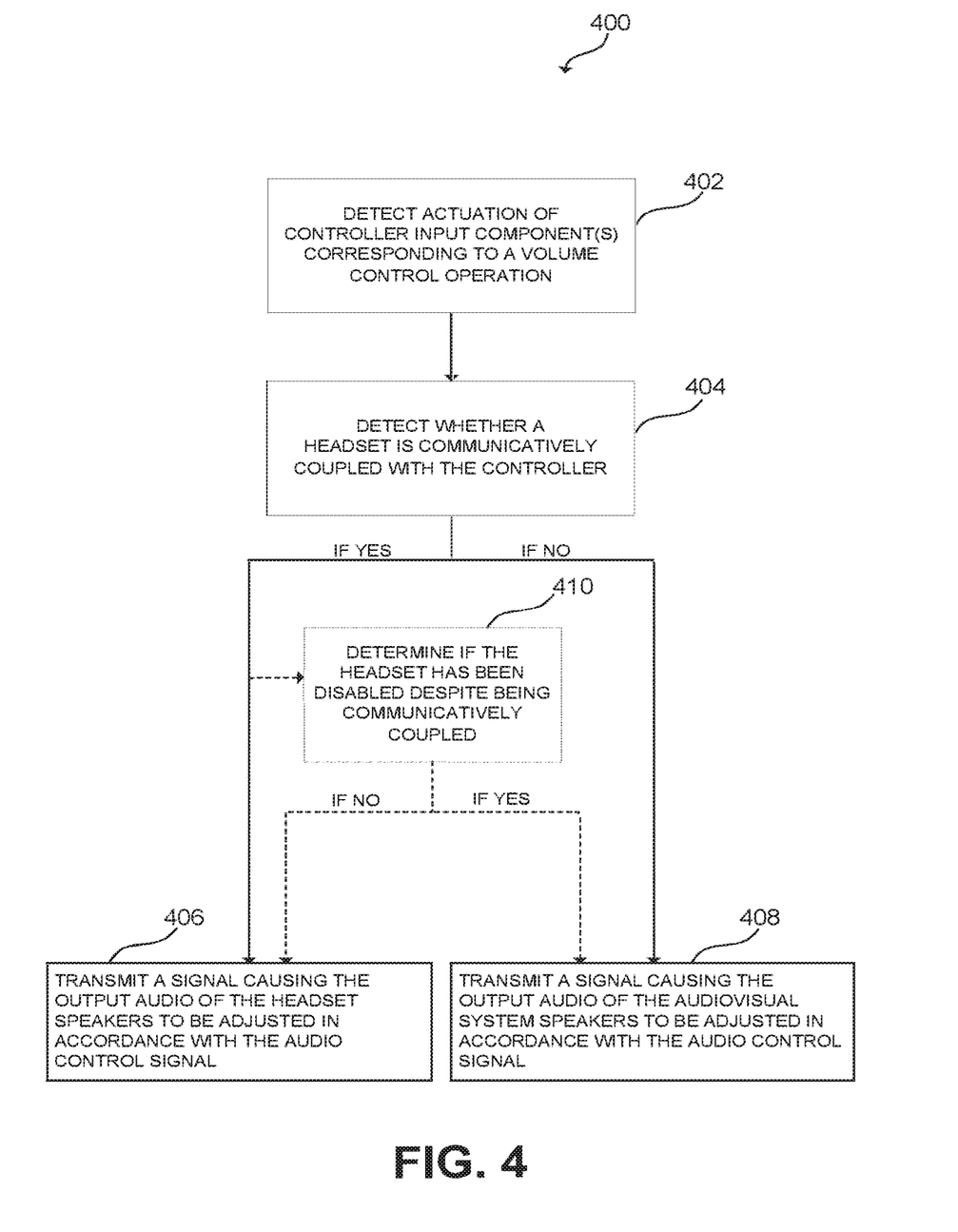
FIG. 4 is a flow chart illustrating an example method that may be implemented by a gaming controller with intelligent audio control in accordance with one or more embodiments of the present disclosure.

FIG. 4 is a flow chart illustrating an example method that may be implemented by a gaming controller with intelligent audio control in accordance with one or more embodiments of the present disclosure. At operation 402, method 400 detects the actuation of one or more input components (e.g., buttons) corresponding to an audio control operation. At operation 404, method 400 detects whether a headset is communicatively coupled (via a wired or wireless communications link) with the controller. If so, operation 406 may transmit an audio control signal to the headset or to driver circuits within the controller, causing the audio characteristic (e.g., the output audio, balance, etc.) of the headset speakers and microphone, as appropriate, to be adjusted in accordance with the audio control operation corresponding to the control signal generated in response to user input. If there is no headset paired, operation 408 may transmit an audio control signal to the console (or to the audiovisual system directly) causing the output audio of the audiovisual system speakers to be adjusted in accordance with the audio control operation the audio control signal encoded.

Optionally, method 400 may include another operation after detecting that a headset is communicatively coupled with the controller. That is, at operation 410, method 400 may determine if the communicatively coupled headset has been disabled (or otherwise not selected for use by the user). If not, operation 406 may transmit an audio control signal to the headset causing the output audio of the headset speakers to be adjusted in accordance with the audio control operation the audio control signal encoded. If so, operation 408 may transmit an audio control signal to the audiovisual system causing the output audio of the audiovisual system speakers to be adjusted in accordance with the audio control operation the audio control signal encoded. Similarly, a button may be provided at gaming controller 210 (or 310) allowing the user to manually select whether audio control actions are implemented at the headset or at the audiovisual system. Any one or more of the foregoing operations and functionality discussed herein may be implemented or controlled by the processing engine of the gaming controller (e.g., processor 202, processor 302, etc.).

It should be appreciated by one of ordinary skill in the art that in some embodiments the processing engine of the gaming console may be utilized to control where audio signals are sent (e.g. to the gaming controller to be relayed to the headset, to the headset directly, or to the audiovisual system). In some embodiments, the audio control signals (as discussed above with reference to FIG. 4, and with reference to FIGS. 2-3) may be generated, processed, transmitted and/or received by the processing engine of the gaming console in addition to or as a substitute for the signals propagated from the gaming controller. For example, the gaming controller may signal to the console that the headset detection circuit has detected that a headset is coupled to the gaming controller, and the processing engine of the console may (responsive to input component actuation corresponding to an audio control operation), source an audio control signal directly to the headset via a wireless interface (e.g. Bluetooth). That is, the processing engine of the console may control where audio signals are sent, and send the signals causing such transmissions based on signals the console receives from the gaming controller. In some embodiments, therefore, the processor of the console and the processor of a gaming controller may operate alone, or in concert, to implement any one or more of the intelligent audio control functions or operations discussed herein.

Referring back now to FIGS. 2 and 3, although these illustrate example embodiments with components and circuits partitioned in the depicted manner, it will be appreciated by one of ordinary skill in the art that various components and circuits of the gaming controllers and systems and described herein may be implemented utilizing any form of hardware, software, or a combination thereof. For example, one or more processors, controllers, ASICs, PLAs, PALs, CPLDs, FPGAs, logical components, software routines or other mechanisms, including associated memory, might be used to implement one or more components or circuits in embodiments of the gaming controllers and systems of the present disclosure. In implementation, the various components and circuits described herein might be implemented as discrete components or the functions and features described can be shared in part or in total among two or more components. In other words, as would be apparent to one of ordinary skill in the art after reading this description, the various features and functionality described herein may be implemented in any given application and can be implemented in one or more separate or shared components in various combinations and permutations. Even though various features or elements of functionality may be individually described or claimed as separate components, in various embodiments these features and functionality can be shared among one or more common software and hardware elements, and such description shall not require or imply that separate hardware or software components are used to implement such features or functionality.

Gaming controllers of the present disclosure might include, for example, one or more processors, controllers, control modules, or other processing devices (e.g., such as processor 202, processor 302, etc.). Such might be provided by general-purpose or special-purpose processing engines such as, for example, a microprocessor, controller, or other control logic. In the illustrated examples in FIGS. 2 and 3, processor 202, 302 is connected to a bus 209, 309, although any communication medium can be used to facilitate interaction with other components of gaming controller 210, 310 or to communicate externally.

Gaming controllers of the present disclosure might include one or more memory modules, simply referred to herein as memory (e.g., memory 203, memory 303, etc.). For example, memory might include random access memory (RAM) or other dynamic memory which might be used for storing information and instructions to be executed by a processing engine of the gaming controller (e.g., by processor 202, by processor 302, etc.). Memory might also be used for storing temporary variables or other intermediate information during execution of instructions to be executed by the gaming controller's processing engine. Memory might likewise include a read only memory ("ROM") or other static storage device coupled to a bus (e.g., bus 209, bus 309, etc.) for storing static information and instructions for an associated processor.

It will be understood by those skilled in the art that the gaming controllers of the present disclosure might include one or more various forms of information storage mechanism, which might include, for example, a media drive and a storage unit interface. The media drive might include a drive or other mechanism to support fixed or removable storage media. For example, a hard disk drive, a solid state drive, a magnetic tape drive, an optical disk drive, a CD, DVD, or Blu-ray drive (R or RW), or other removable or fixed media drive might be provided. Accordingly, storage media might include, for example, a hard disk, a solid state drive, magnetic tape, cartridge, optical disk, a CD, DVD, Blu-ray or other fixed or removable medium that is read by, written to or accessed by media drive. As these examples illustrate, the storage media can include a computer usable storage medium having stored therein computer software or data.

In alternative embodiments, information storage mechanisms that may be implemented in one or more embodiments of the present disclosure might include other similar instrumentalities for allowing computer programs or other instructions or data to be loaded into one or more computing components of gaming controllers. Such instrumentalities might include, for example, a fixed or removable storage unit and an interface. Examples of such storage units and interfaces can include a program cartridge and cartridge interface, a removable memory (for example, a flash memory or other removable memory module) and memory slot, a PCMCIA slot and card, and other fixed or removable storage units and interfaces that allow software and data to be transferred from the storage unit to the gaming controller (e.g., to a memory of the gaming controller).

As described herein, and as one of ordinary skill in the art will appreciate, gaming controllers of the present disclosure might include a communications interface (e.g., a wireless communications circuit 304, wireless communications circuit 305, port 204, port 205, other communications circuits, and the like). Such communications interfaces might be used to allow software and data to be transferred between the gaming controller and external devices. Additional nonlimiting examples of communications interfaces might include a modem or softmodem, a network interface (such as an Ethernet, network interface card, WiMedia, IEEE 802.XX or other interface), a communications port (such as for example, a USB port, IR port, RF port, RS232 port Bluetooth® interface, or other port), or other communications interfaces. Software and data transferred via a communications interface might typically be carried on signals, which can be electronic, electromagnetic (which includes optical) or other signals capable of being exchanged by a given communications interface. These signals might be provided to the communications interface via a channel (e.g., communications link 271, 272, 371, 372). This channel might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium," "computer readable medium" and "computer usable medium" are used to generally refer to transitory or non-transitory media such as, for example, memory, storage unit, media, and channel discussed above. These and other various forms of computer program media, computer readable media, or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the gaming controller to perform features or functions of the present application as discussed herein.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

I claim:

1. A gaming controller, comprising:
a plurality of input components;
a housing coupled with the plurality of input components;
a processor;
an audio jack for receiving an audio connector of an audio headset, the audio jack communicatively coupled with the processor;
a communications circuit communicatively coupled to the processor, wherein the communications circuit is configured to establish a connection to a gaming console, the gaming console configured to be communicatively coupled to an audiovisual system using a cable;
an audio headset detection circuit communicatively coupled to the processor, the audio headset detection circuit comprising a switch coupled to the audio jack, the switch caused to be in a first state when an audio connector has been plugged into the audio jack, the switch caused to be in a second state when no audio connector has been plugged into the jack; and
a transmitter that is configured, in response to actuation of one or more of the plurality of input components corresponding to an audio control operation, to transmit:
an audio control signal causing an audio attribute of sound outputted by a speaker of the audio headset to be adjusted if the switch of the audio headset detection circuit is in the first state; and
an audio control signal causing the audiovisual system to adjust an audio attribute of sound outputted by a speaker of the audiovisual system if the switch of the audio headset detection circuit is in the second state.

2. The gaming controller of claim 1, wherein the first state is a closed state and the second state is an open state.

3. The gaming controller of claim 1, wherein the first state is an open state and the second state is a closed state.

4. The gaming controller of claim 1, wherein the actuation of one or more of the plurality of input components corresponding to the audio control operation includes one or more of: a pattern of simultaneous input component actuations, an ordered sequence of individual input component actuations, and a single individual input component actuation.

5. The gaming controller of claim 1, wherein the audio control signal causing the audiovisual system to adjust the audio attribute of sound outputted by the speaker of the audiovisual system is transmitted from the gaming controller to the gaming console using the communications circuit, causing the gaming console to generate a second signal that is transmitted to the audiovisual system over the cable causing the audio attribute of sound outputted by the speaker of the audiovisual system to be adjusted.

6. The gaming controller of claim 1, wherein the audio control signal causing the audiovisual system to adjust the audio attribute of sound outputted by the speaker of the audiovisual system is transmitted directly from the gaming controller to the audiovisual system.

7. The gaming controller of claim 6, wherein the audiovisual system is a television set.

8. The gaming controller of claim 1, wherein the communications circuit communicatively coupled to the processor comprises a second cable communicatively coupled to the processor, the second cable affixed to the housing at a proximal end, and insertable into a socket of the gaming console at a distal end to establish a connection to the gaming console.

9. The gaming controller of claim 1, wherein the communications circuit is configured to establish a wireless connection to the gaming console.

10. The gaming controller of claim 1, wherein the audio control operation comprises a volume increase, a volume decrease, an audio muting, or audio adjustment of bass sounds relative to treble sounds.

11. The gaming controller of claim 1, wherein plurality of input components comprise a button, a directional pad, a joystick, a dial, a trigger, a bumper, a wheel, a slider switch, and a toggle switch.

12. A method, comprising:
detecting, at a gaming controller, user actuation of one or more input components of the gaming controller corresponding to an audio control operation, wherein the gaming controller is communicatively coupled to a video game console using a cable or wireless connection;
detecting, at the gaming controller, whether an audio connector of an audio headset is coupled to an audio jack of the gaming controller;
if it is detected that the audio connector of the audio headset is coupled to the audio jack of the gaming controller, transmitting an audio control signal from the gaming controller to the headset causing the audio of sound emissions outputted by an audio output device of the headset to be adjusted in accordance with the audio control operation; and
if it is detected that the audio connector of the audio headset is not coupled to the audio jack of the gaming controller, transmitting an audio control signal from a transmitter of the gaming controller that causes an audiovisual system communicatively coupled to the video game console to adjust audio of sound emissions outputted by an audio output device of the audiovisual system in accordance with the audio control operation.

13. The method of claim 12, wherein the audio control signal that causes the audiovisual system to adjust the audio of sound emissions outputted by the audio output device of the audiovisual system in accordance with the audio control operation is transmitted to the video game console, causing the video game console to signal the audiovisual system to adjust the audio of sound emissions outputted by the audio output device of the audiovisual system in accordance with the audio control operation.

14. The method of claim 13, wherein the gaming console is communicatively coupled to the audiovisual system using a cable.

15. The method of claim 12, wherein the audio control signal that causes the audiovisual system to adjust the audio of sound emissions outputted by the audio output device of the audiovisual system to be adjusted is transmitted directly from the gaming controller to the audiovisual system.

16. The method of claim 12, wherein the audio control operation comprises a volume increase, a volume decrease, an audio muting, or audio adjustment of bass sounds relative to treble sounds.

17. The method of claim 12, wherein the gaming controller comprises an audio headset detection circuit, the audio headset detection circuit comprising a switch coupled to the audio jack, the switch caused to be in a first state when the audio connector has been plugged into the audio jack, the switch caused to be in a second state when no audio connector has been plugged into the audio jack.

18. The method of claim 12, wherein the one or more input components comprise a button, a directional pad, a joystick, a dial, a trigger, a bumper, a wheel, a slider switch, and a toggle switch.

19. A system, comprising:
a gaming console; and
a video game controller, the video game controller comprising:
a plurality of input components;
a housing coupled with the plurality of input components;
a processor;
an audio jack for receiving an audio connector of an audio headset, the audio jack communicatively coupled with the processor;
a communications circuit communicatively coupled to the processor, wherein the communications circuit is configured to establish a connection to the gaming console, the gaming console configured to be communicatively coupled to an audiovisual system using a cable;
an audio headset detection circuit communicatively coupled to the processor, the audio headset detection circuit comprising a switch coupled to the audio jack, the switch caused to be in a first state when an audio connector has been plugged into the audio jack, the switch caused to be in a second state when no audio connector has been plugged into the jack; and
a transmitter that is configured, in response to actuation of one or more of the plurality of input components corresponding to an audio control operation, to transmit:
an audio control signal causing an audio attribute of sound outputted by a speaker of the audio headset to be adjusted if the switch of the audio headset detection circuit is in the first state; and
an audio control signal causing the audiovisual system to adjust an audio attribute of sound outputted by a speaker of the audiovisual system if the switch of the audio headset detection circuit is in the second state.

\* \* \* \* \*